UNITED STATES PATENT OFFICE.

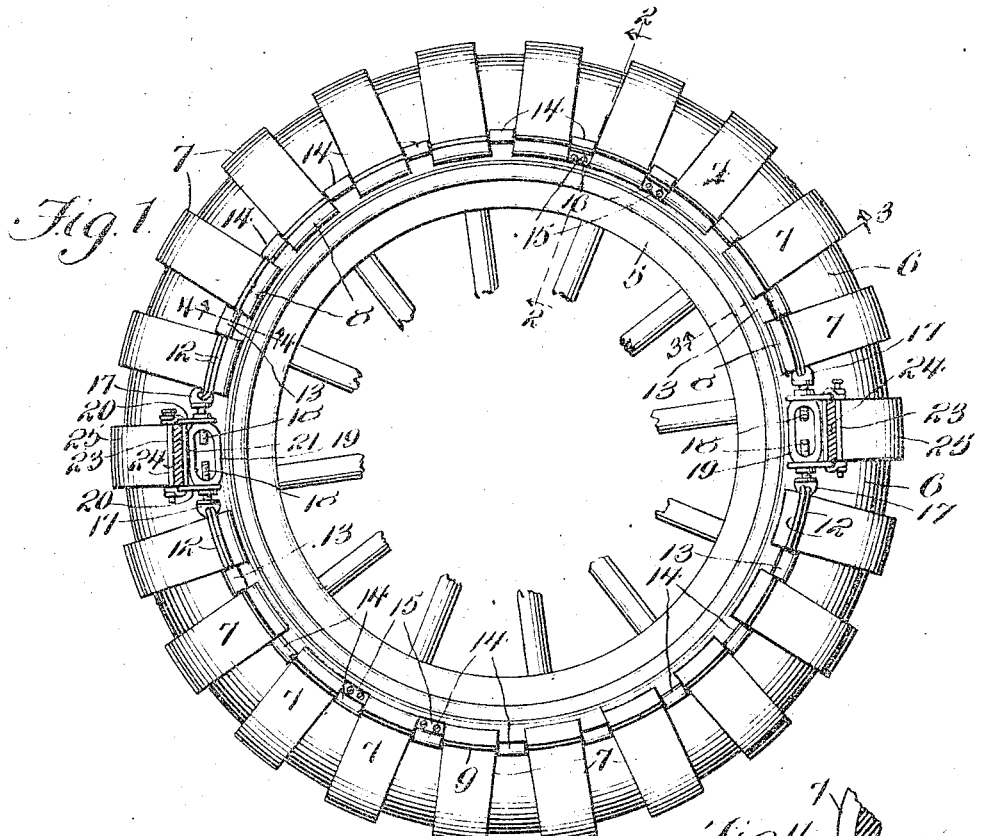

ALFRED H. DAY, OF WACO, TEXAS.

TIRE-PROTECTOR.

1,031,534.   Specification of Letters Patent.   Patented July 2, 1912.

Application filed January 13, 1912. Serial No. 670,990.

*To all whom it may concern:*

Be it known that I, ALFRED H. DAY, a citizen of the United States, residing at Waco, in the county of McLennan and State of Texas, have invented new and useful Improvements in Tire-Protectors, of which the following is a specification.

The invention relates to tire armors, and more particularly to the class of tire protectors.

The primary object of the invention is the provision of a tire protector in which there is arranged a plurality of cross sections which are adapted to straddle the tire body at intervals and are connected in independent series, so as to provide a two-part protector, adjustable to permit its use on tires of different diameters.

Another object of the invention is the provision of a tire protector which is prevented from creeping, when placed upon a tire, and that will obviate wear thereof, or the possibility of the skidding of the wheel during its travel over slippery surfaces.

A further object of the invention is the provision of a tire protector which is simple in construction, strong, durable, readily and easily applied to and removed from a tire, and that is reliable and efficient for its purpose, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a vehicle wheel with its tire, showing the tire protector constructed in accordance with the invention mounted thereon. Fig. 2 is a sectional view on the line 2—2 of Fig. 1. Fig. 3 is a sectional view on the line 3—3 of Fig. 1. Fig. 4 is a fragmentary sectional view on the line 4—4 of Fig. 1. Fig. 5 is an enlarged side elevation of one of the end connecting loops and its rings. Fig. 6 is a sectional view on the line 6—6 of Fig. 5, looking in the direction of the arrow, showing in dotted lines a portion of one of the straddling sections of the protector.

Similar reference characters indicate corresponding parts throughout the several views of the drawings.

Referring to the drawings by numerals, 5 designates the usual tire receiving rim of a vehicle wheel, and 6 the tire body, which is of the pneumatic type of the ordinary construction, the same being mounted in the rim 5, as usual, and on this tire body 6 is applied the tire protector, presently described. This tire protector comprises a plurality of sections 7, each being formed from material commonly used in making the ordinary pneumatic tires, and are adapted to straddle the tire body 6, at intervals throughout the circumference thereof. Each section 7 is formed at its free end edges with enlargements projecting outwardly therefrom to provide clencher flanges or tongues 8, and connecting the sections 7 in independent series and in semi-circular arrangement are inner and outer retaining wires 9 and 10, respectively, arranged in pairs at opposite sides of the sections, the outer retaining wires 10 being seated in grooves 11 formed in the clencher flanges or enlargements 8, while the inner wires 9 are disposed at the inner side of the sections, directly opposite the wires 10. The ends of the wires 9 and 10 connecting each series of sections 7 are reversely bent to form loop terminals 12, the reversely bent ends of the said wires 9 and 10 being engaged in sleeves 13, surrounding the said wires 9 and 10 between the outermost sections 7 and the next adjacent sections of each series, the sleeves 13 being designed to prevent the opening of the loop terminals 12, and also serving as spacers for the said sections. Surrounding the wires 9 and 10 between the remaining sections 7 of each series are spacer sleeves 14, which sustain the said sections in spaced relation and at equidistance from each other. At least two of the spacer sleeves 14, at opposite sides of the tire body, between the sections 7 of each series are split and formed with outturned parallel wings 15, and passed through the said wings 15 are ordinary bolt members 16.

It will be seen that the split sleeves may be readily removed, so as to vary the space between the sections 7 of the protector.

Loosely connected to the loop terminals 12 of the wires 9 and 10 are the eye heads 17 of reversely threaded screws 18 which are adjustably engaged in turn-buckles 19, the same being designed, when turned in one direction, to tighten the retaining wires 9 and 10 for the secure fastening of the tire protector upon the tire body 6 of the wheel. Removably engaged about opposite ends of the turn-buckles 19 are rings 20 loosely carried upon substantially U-shaped end or coupling loops 21 formed with coiled eye ends 22, in which are detachably mounted securing pins 23, and these loops 21 are detachably engaged with the clencher flanges 24 of intermediate sections 25 straddling the tire body 6, between the independent series of sections 7 about the tire of the wheel.

What is claimed is:

1. A tire protector, comprising a plurality of tread sections, inner and outer retaining wires engaging the ends of said sections to connect the same in independent series, turn buckles connected with the wires at the ends thereof, and means surrounding the wires between the sections for spacing the latter.

2. A tire protector comprising a plurality of tread sections having hook-like ends, inner and outer retaining wires engaging the hook-like ends of said sections to connect the same in independent series, turn-buckles having perforated adjusting screws receiving the wires at the ends thereof, the ends of said wires being reversely bent to form loop terminals, means surrounding the loop terminals of the wires to prevent spreading thereof, end tread sections interposed between the series of first named sections, yokes having removable pins detachably engaged over the ends of said end tread sections, and rings loosely carried by the yokes and engaging the turn-buckles.

In testimony whereof I affix my signature in presence of two witnesses.

ALFRED H. DAY.

Witnesses:
J. K. ROSE,
E. A. DEATON.